Oct. 9, 1956 D. D. RITCHEY 2,766,448
SIRENS
Filed April 9, 1951 3 Sheets-Sheet 1
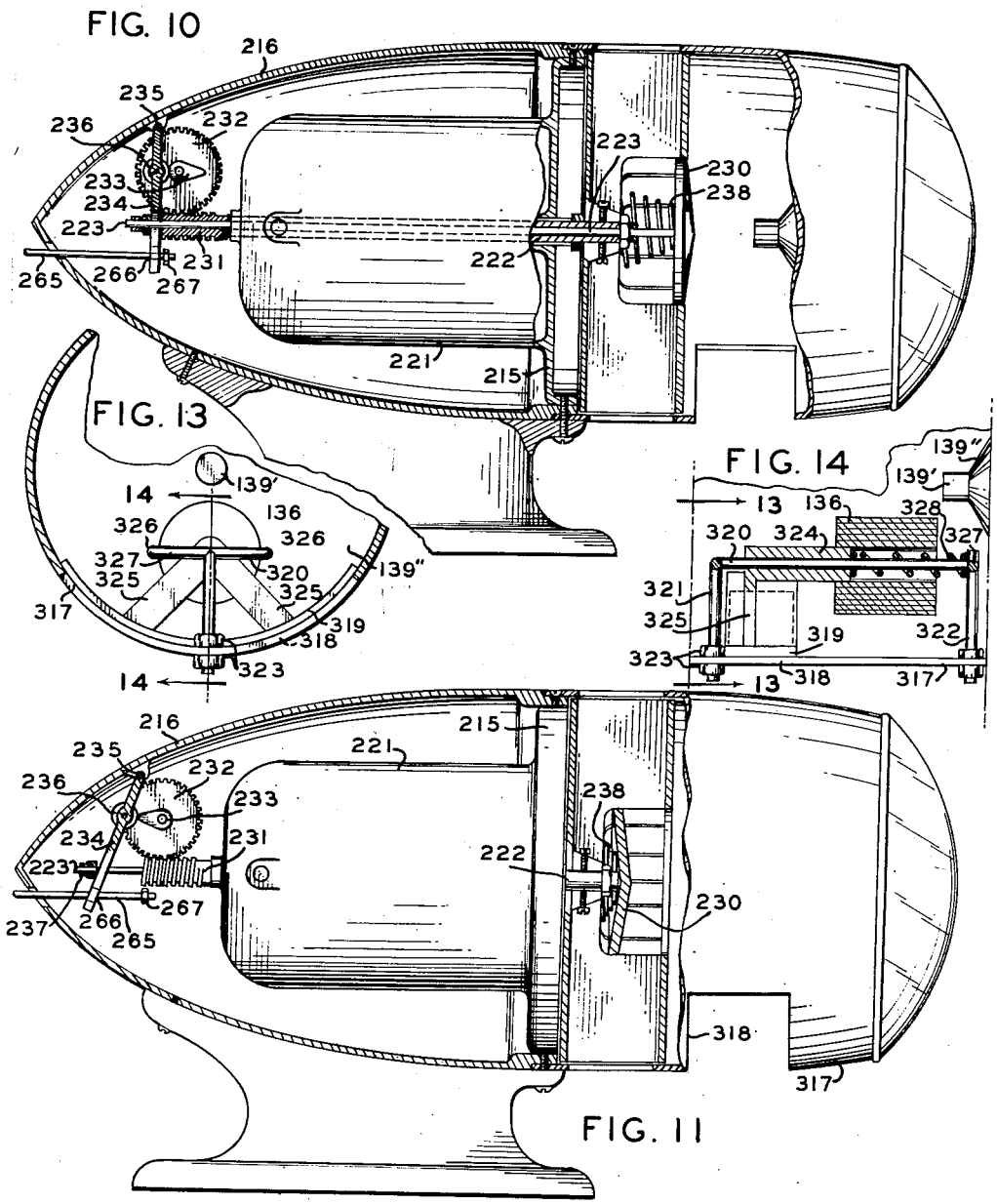
INVENTOR.
DONALD D. RITCHEY
BY
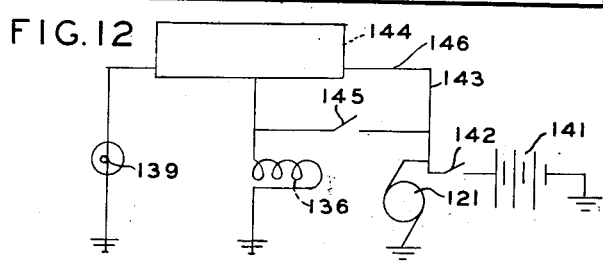
ATTORNEY Oct. 9, 1956  D. D. RITCHEY  2,766,448
SIRENS
Filed April 9, 1951  3 Sheets-Sheet 2
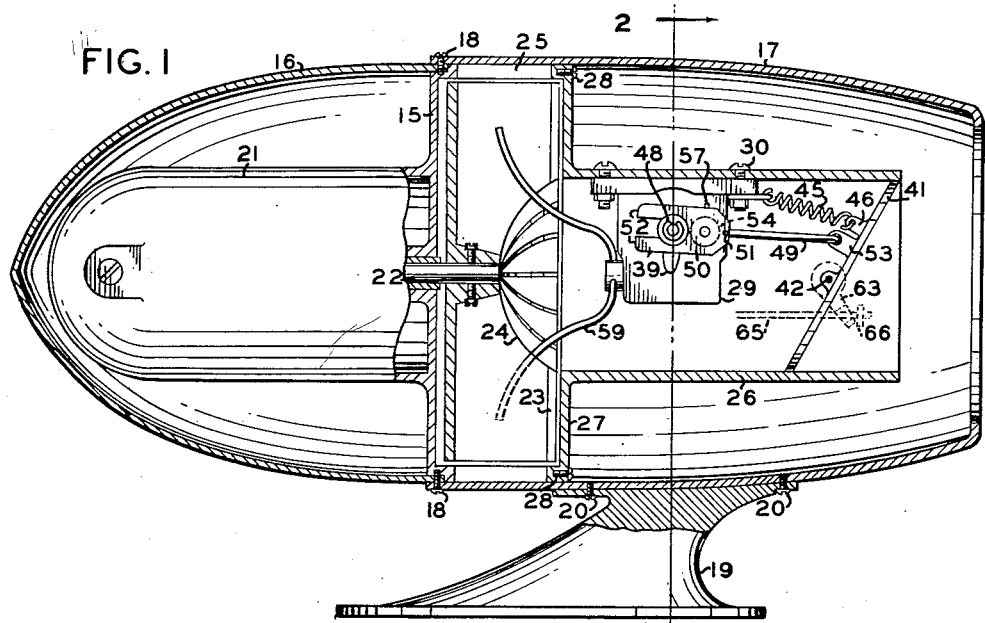
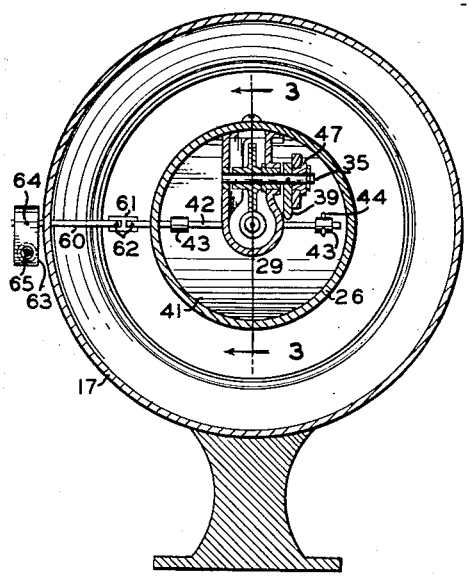
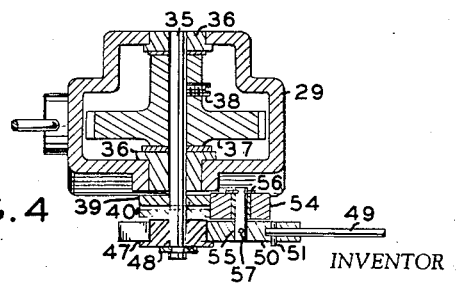
INVENTOR
DONALD D. RITCHEY
BY
ATTORNEY Oct. 9, 1956  D. D. RITCHEY  2,766,448
SIRENS
Filed April 9, 1951  3 Sheets-Sheet 3
FIG. 5
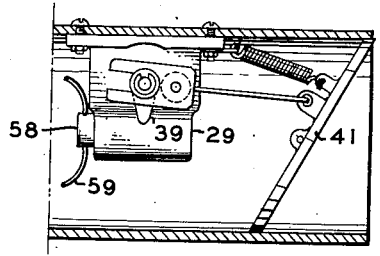
FIG. 6
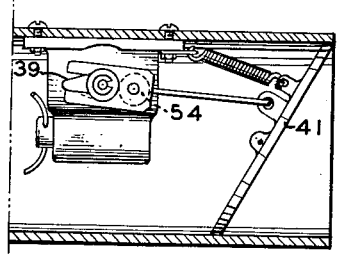
FIG. 7
FIG. 8
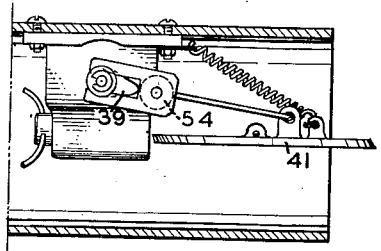
FIG. 9
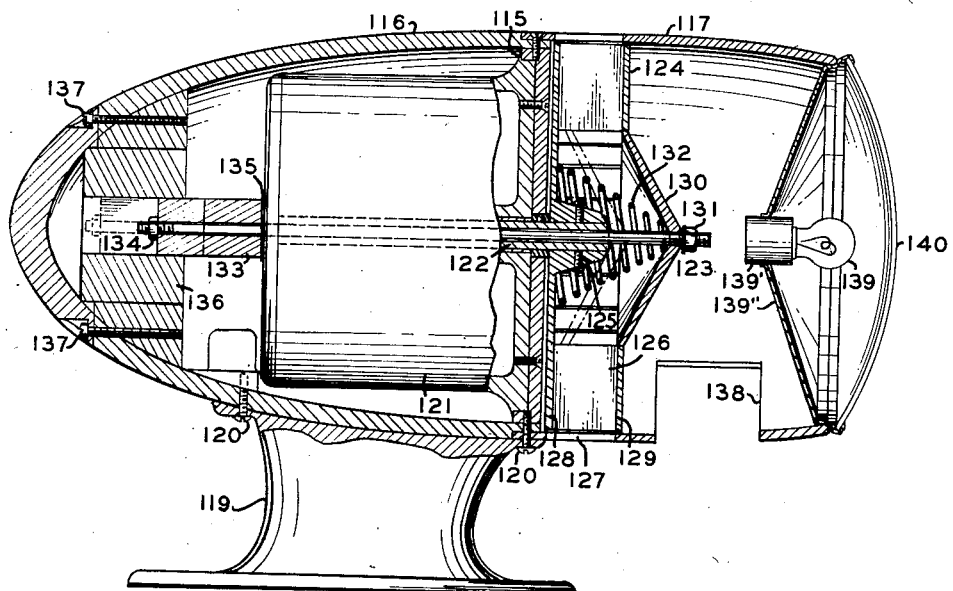
INVENTOR.
DONALD D. RITCHEY
BY
ATTORNEY

United States Patent Office 2,766,448
Patented Oct. 9, 1956

2,766,448

SIRENS

Donald D. Ritchey, Brookmont, Md., assignor of one-third to Milford A. Juten, Brookmont, Md.

Application April 9, 1951, Serial No. 219,975

6 Claims. (Cl. 340—405)

The present invention relates to sirens and particularly to sirens used on emergency vehicles. More particularly the present invention relates to sirens which are constructed to produce intermittent sounds.

Heretofore sirens used on emergency vehicles have been manually controlled and the control was dependent upon the human element. Ordinarily this control amounted to merely pressing a switch to turn the siren on and releasing the switch to turn the siren off. This resulted in haphazard control and gave some rising and falling sounds. However these rising and falling sounds did not command attention as their gradually changing tone did not obtain the result of demanding the attention of the people within hearing distance.

Another objection to the previously known sirens was due to the fact that a continuously operated siren gave a sound very similar to that produced by gears in trucks and busses. As a result the operators of busses and trucks as well as the operators of emergency vehicles such as fire trucks and ambulances would become confused as to the origin of the sounds that were heard. This resulted in many serious collisions between busses, trucks and emergency vehicles and consequently the prior art failed to solve the problems involved in the use of sirens.

Another defect of continuously sounding sirens now in use is that in the event two vehicles are approaching an intersection with their sirens operating the vehicle driver can hear no sounds except those coming from his own siren and therefore is not aware that a second vehicle is approaching the intersection and as a result collisions all too frequently occur.

Another defect of the continuously sounding siren is that the source of the sound cannot be determined. Apparently this may be due to the intermingling of echoes with the original sound and therefore it is not possible to estimate the location of the siren or the vehicle upon which it is mounted.

It is therefore an object of the present invention to overcome the deficiencies of constantly sounding sirens by designing the control of the siren to have periods of silence for short periods of time between the periods of intense sound. These short periods of silence allow the vehicle operator to hear the siren of a vehicle approaching the intersection from a different direction and thereby make it possible to avoid collisions.

Another object of the present invention is to provide a siren which has sound characteristics which make it possible for a person to determine the location of the siren and the vehicle on which it is mounted. This is an important element in preventing collisions with emergency vehicles because a person knowing the location of the sounds will be able to avoid a collision.

A further object of the present invention is to provide a siren which will produce a sound that is readily distinguishable from other sounds and particularly distinguishable from the sounds produced by driving gears in trucks and busses.

Another object of the present invention is to provide a siren which may be manually controlled for continuous sounding and may be automatically operated to produce periodic changes in sound without requiring the attention of the operator.

A further object of the present invention is to so construct a siren that piercing sounds will be produced thereby at short periodic intervals without requiring the attention of the operator.

Another object of the present invention is to provide an attachment for sirens already in use which attachment will produce the periodic interruption of sound.

Another object is to control the flow of air through a siren in such a way as to produce sharp blasts of short duration which will demand the attention of the persons within hearing distance thereof.

Another object of the present invention is to provide a drive which may be connected to existing sirens and driven by engagement with the rotor thereof for controlling the passage of air through the siren, the drive connection being of universal type for driving engagement with the siren rotor.

Another object is the design of structure for controlling the flow of air through a siren with a minimum of alteration of the conventional sirens already in use.

Another object is to provide an electrical control for the flow of air to an inlet of a siren which may be intermittently operated by a moving part of the siren or by some external means.

It is a further object to provide a control for sirens of any type including air raid warning sirens where the control is from a remote point.

Other and further objects will become apparent as the description proceeds and upon reference to the accompanying drawings, wherein:

Figure 1 is a longitudinal sectional view of a siren having the attachment of the present invention applied thereto, Figure 2 is a sectional view taken on line 2—2 of Fig. 1, Figure 3 is a section on line 3—3 of Fig. 2 showing a fragmentary sectional view of the gear housing, Figure 4 is a sectional view taken on line 4—4 of Fig. 3, Figures 5, 6, 7, and 8 are fragmentary sectional views of the attachment shown in Fig. 1 showing various positions of the cam and the butterfly valve controlled thereby, Figure 9 is a longitudinal sectional view of a modified form of the invention wherein a solenoid provides the control of the valve, Figure 10 is a sectional view of a further modification in which a poppet valve has a stem slidable in a hollow shaft and actuated by a cam, showing the valve in closed position, Figure 11 is a sectional view similar to Figure 10 and showing the valve in open position, Figure 12 is a wiring diagram which is used for controlling the modifications of the invention shown in Figures 9, 13 and 14, Figure 13 is a further modification of a solenoid controlled valve mounted in the cylindrical cover of a siren taken on the line 13—13 of Fig. 14, Figure 14 is a sectional view of Fig. 13 taken on line 14—14 of Fig. 13.

Upon reference to the accompanying drawings wherein like reference numerals refer to like parts throughout and more particularly to Figs. 1 to 8 inclusively, a siren casing 15 is positioned within a rear cover 16 and a front cover 17. The front cover 17 telescopes over the siren casing and over the rear casing 16 and is secured thereto by fastening elements 18. A base or bracket 19 supports the cover and is attached thereto by screws 20 or any other suitable means. A motor 21 fixedly mounted on the siren casing carries a shaft 22 upon which is mounted a siren rotor 23 having radial blades 24 with the extremities of the blades arranged in close relation to the periphery of the casing. Opening 25 in the casing and cover allow air to be forced therethrough. A tube 26 having a flange 27 at one end thereof is removably secured to the siren casing by screws 28 or other suitable fastening means. A gear housing 29 of flat shape is mounted within the tube and extends in the direction of the tube and radially thereof so as to interfere the least with the flow of air through the tube. The gear housing is secured to the inner periphery of the tube by suitable fastening means such as screws 30. A first shaft 31 is mounted in the gear housing for rotation about an axis susbtantially the same as the axis of the tube 26 on flanged permanently lubricated bearings 34. A worm 32 positioned within the housing is fixed to the shaft by means of a tapered pin 33.

A second shaft 35 is arranged transversely of and spaced from the first shaft 31 and is rotatably mounted in the gear housing 29 in flanged bearings 36 with one end projecting from the gear housing. A worm gear 37 is fixed to the second shaft 35 by means of a set screw 38 threaded through the boss of the worm gear and pressing against the shaft 35. A suitable gear ratio of worm to worm gear has been found to be 1 to 60.

An elliptical shape butterfly valve 41 is pivotally mounted within the tube 26 with its minor axis substantially parallel to the second shaft 35. The pivotal mounting of butterfly valve 41 comprises a shaft 42 extending through lugs 43 on the butterfly valve and fixed to one of the lugs by a tapered pin 44. The shaft 42 is rotatably mounted in bores formed in the wall of the tube 26 with one end projecting outwardly of the tube. A tension spring 45 has one end secured to the butterfly by any suitable means such as an apertured lug 46 spaced from the axis of the butterfly while the other end of the spring 45 is connected to any suitable fixed means such as attaching screw 30. It will be observed that the spring 45 normally holds the butterfly valve in closed position.

A cam 39 is fixed to a projecting end of shaft 35 by means of a tapered pin 40.

A flanged roller 47 is rotatably mounted on the shaft 35 outwardly of the cam 39 with the flange of the roller adjacent the outer end of the shaft, and is retained thereon by a horseshoe shaped spring clip 48 engaging a circumferential groove of the shaft. A link 49 which may be formed of a rod of circular cross section extends into an opening at one end of a yoke 50 and is secured thereto by means of a tapered pin 51. The other end of the yoke is forked to provide a slot formed between legs 52 which straddle roller 47 and are retained thereon by the flange of roller 47. The other end of link 49 is pivotally connected to butterfly 41 by any suitable means such as an L-shaped end extending into an opening in lug 53 and secured thereto by any suitable means such as a horseshoe shaped spring slip extending into a grooved end of the L-shaped end of link 49. A follower in the form of a roller 54 is rotatably mounted on stub shaft 55 and retained thereon by spring clip 56 similar to spring clip 48. The stub shaft 55 may be secured to yoke 50 by a taper pin 57.

A collar 58 having a bore snugly fitting shaft 31 is mounted on the projecting shaft 31 adjacent the rotor of the siren. A resilient elongated member 59 extends through an opening formed in the collar 58 and shaft 31 with the free ends of the member 59 extending substantially equal distances toward the rotor 23 of the siren for driving engagement with the blades thereof. It will be seen that the collar 58 serves to strengthen the narrow elongated member 59 adjacent the shaft 31 making it possible to use a very light wire which has very little weight. As a result there is practically no danger of unbalance by the driving connection and the light wire takes up any irregularities which may occur in the alignment of shaft 31 with respect to the rotor of the siren and acts in effect like a universal joint. This is an important feature of applicant's invention and constitutes one of the important features thereof.

In the event it is desired to operate a siren incorporating the features of the present invention in a continuous manner a manually operated means is provided to hold the butterfly valve open. A shaft 60 is pivoted through the cover 17 and arranged in end to end relation with the butterfly mounting shaft 42. A sleeve 61 surrounds the adjacent ends of the shafts 60 and 42 and is fixed to both shafts by any suitable means such as tapered pins 62. A lever 63 is fixed to the projecting end of shaft 60 by any suitable means such as tapered pin 64. The lever 63 is provided with an opening at the free end thereof through which a wire extends. A collar 66 is secured to the end of the wire 65 by any suitable means and serves as an abutment for engaging the lever 63 when the wire 65 is moved in a direction to open the butterfly valve to the position shown in Fig. 8.

It will be observed that the opening in the free end of lever 63 is sufficiently large so that the lever may move freely when the butterfly is actuated by the cam 39 and therefore the presence of the wire 65 does not interfere with the normal operation of the cam 39 or the butterfly valve. However, when it is desired to have the siren make a continuous sound, the wire 65 will be moved to retain the butterfly valve in the open position shown in Fig. 8. It will be understood that a conventional Bowden wire or any other suitable means may be used for controlling the movement of the wire 65, and the operation of lever 63. Also it will be apparent that other types of lost motion connection may be used for this purpose.

Referring more particularly to Fig. 9 a siren comprises a member 115, a front cover 117, and a rear cover 116. The covers surround the siren and the structure is supported on base or support 119, to which it is attached by attaching screws 120. A motor 121 is secured to member 115 by any suitable means such as screws or the like. The motor is provided with a hollow shaft 122 which slidably receives a valve stem 123 which projects from both ends of the hollow motor shaft. The siren rotor 124 has its hub fixed to one end of the motor shaft by means of set screws 125 or the like. The blades 126 of the rotor extend outwardly from a location spaced from the center of the rotor to a location adjacent slots 127 in the cover 117. The rotor also includes a main supporting plate 128 which is secured to the hub of the rotor and to the blades 126. At the outer edge of the rotor an annular ring 129 is attached to the rotor blades. The valve stem 123 of non-magnetizable material such as bronze has secured to one end thereof a poppet valve disc 130 of conical shape which may be threaded onto the end of the shaft and held in place by a lock nut 131. A cone-shaped compression spring 132 is positioned between the rotor plate 128 and the conical shaped valve disc 130 and urges the valve disc outwardly to the position shown in full lines in Fig. 9 for preventing air from entering the siren rotor. The other end of the valve stem 123 has an iron core 133 secured thereto by any suitable means such as a locknut 134. A washer 135 of non-magnetizable material serves to space the iron core from the end of the hollow shaft 122 and is so arranged as to limit the forward position of the valve disc 130 to close the inlet opening to the siren rotor. The lock nuts 134 and 131 serve to obtain proper adjustment of the parts. A solenoid coil 136 is mounted in fixed relation to the motor as on the cover 116 by any suitable means such as screws 137 and is so positioned with respect to the iron core 133 that when the solenoid 136 is energized the magnetic core is moved into the solenoid to the dotted line position and thereby moves the valve disc 130 to open the inlet to the siren rotor and allow air to pass therethrough. It will be observed that a suitable opening 138 is provided in the cover 117 to allow air to flow through the siren rotor. The opening 138 is so located as to prevent the entrance of rain or snow to the siren.

From the above description it will be seen that the siren rotor may be continuously operated and produce an intermittent sound at any desired interval by energizing the solenoid 136 at the time it is desired to have the sound produced. This type of siren may be used alone or in combination with a signal light, frequently used on emergency vehicles and may take the form of an incandescent filament 139 in a support 139' in a suitable position to have its light reflected by a reflector 139" through a lens 140 which may be red and of conventional design. This signal light is mounted at the front end of the front cover 117 and is intermittently operated by any suitable means.

Referring more particularly to Fig. 12 a suitable wiring diagram is shown for operating the solenoid 136 and the filament 139 to produce intermittent signals therefrom. A battery 141 is grounded on one terminal in a conventional manner. A first switch 142 controls the main supply of current from the battery to the motor 121, solenoid 136 and the lamp filament 139 and is connected by a wire 143 to a current interrupter 144 which intermittently supplies current to the lamp filament and the solenoid. The current interrupter is of conventional design and is adapted to operate the solenoid for short periods of time and cause deenergization of the solenoid for a somewhat longer period. A suitable current interrupter is disclosed in U. S. Patent 1,979,349. A second switch 145 is shunted from wire 143 to the solenoid 136 so that upon actuation of switch 145 the siren may be used to produce a continuous sound. An additional switch 146 which is normally closed may be provided to allow the siren rotor to get up to speed before the valve is opened. It will be understood that the switches will be positioned in such a position as to be readily accessible to the operator.

The supply of current to solenoid 136 may be controlled by other types of current interrupters. Such current interrupters may take the form of a switch operated by a rotating element. Such rotating elements may be found on a conventional type of light signal used on emergency vehicles. This light includes a sealed beam light source for producing a flat wide beam which is rotated about the axis of the flat beam of light by a rotating element operated by an electric motor or the like. A cam could be applied to such a rotating element for controlling a switch for operation of solenoid 136. Other means for producing the interruption of current to solenoid 136 may include a rotating disc or drum having contacts on the surface thereof for making and breaking the electric circuit to solenoid 136.

Referring more particularly to the modification of Figures 10 and 11 a member 215 supports a motor 221 having a hollow shaft 222. A valve stem 223 is slidably mounted in shaft 222 and supports valve disc 230 at one end thereof. The valve and stem are movable from the closed position shown in Fig. 10 to the open position shown in Fig. 11 by a suitable cam and lever mechanism. A worm 231 is secured to the rear end of the motor shaft and rotates therewith. A worm gear 232 in mesh with worm 231 is mounted for rotation about an axis transverse to the motor axis and is supported by any suitable means from the motor or the rear cover 216. A cam 233 is mounted in fixed relation to worm gear 232 and rotates therewith. A rock lever 234 is pivoted at 235 to a suitable support secured to the motor 231 or the casing 216 and carries a follower 236 in the form of a roller for contacting cam 233 whereby the rock lever is oscillated upon movement by cam 233 during rotation of worm gear 232. The free end of the rock lever 234 is provided with a slot 236 through which valve stem 223 extends. An anti-friction bearing 237 has one race fixed to the rear end of the valve stem 223 and the other race engages rock lever 234 so that the valve stem is moved rearwardly by the action of the cam moving valve disc 230 to the open position of Fig. 11. The valve stem is urged in the opposite direction to close the valve by compression coil spring 238 to prevent air passing through the siren. A wire 265 passes through an opening 266 in an extension of the rock lever 234 and has an abutment 267 fixed on wire 265 for engaging the rock lever for moving the rock lever to the position shown in Figure 11 for holding the valve stem and the attached disc in their open positions when it is desired to have the siren operate continuously.

Referring more particularly to the modification of the invention shown in Figures 13 and 14, reference numeral 317 shows a section of a forward cylindrical shaped cover of a siren having an inlet opening 318 for the admission of air into the cover to thereafter pass into the siren rotor. A closure 319 of complementary cylindrical shape and of a size to overlap the ends of the opening (as shown more particularly in Figure 13) is mounted for sliding movement in a direction parallel to the axis of the cylindrical cover 317. A U-shaped rod having a bight portion 320 of non-magnetizable material arranged parallel to the axis of the cylinder and leg portions 321, 322 extending to the periphery of the cover is secured to the cover by nuts 323 threaded on the ends of the legs for adjustably supporting the bight portion 320 in a desired position. A sleeve 324 of magnetizable material such as iron is slidably mounted on bight portion 320 and is connected by supporting members 325 to the closure for slidably supporting the closure for movement from open to closed position and vice versa. It will be noted that the ends of the closure overlap the material of the cover 317 adjacent to the ends of the opening 318 so that the cover is guided by the bight portion 320 and the inner periphery of the cylindrical cover 317 requiring no other guide means when the closure is moved from its position closing the opening 318 to an open position. A solenoid 136 is mounted in fixed relation to the bight portion 320 by any suitable means such as longitudinally extending rods 326 supported from legs 321 by horizontal arms 327. The solenoid 136 is secured to the rods 326 by any suitable means. A compression coil spring 328 extends between the sleeve 324 and the leg 322 and normally biases the sleeve 324 and the closure 319 carried thereby to the closed position shown in Fig. 14. It will be observed that the solenoid 136 is suitably connected to the source of electric power in susbtantially the same manner as in the modification shown in Figures 9 and 12. It will further be observed that air passing through inlet 318 will tend to move closure 319 away from the inner periphery of the cylindrical casing 317 thereby reducing any tendency of binding of the cover in its sliding motion. Further, it will be observed that the center of gravity of the cover is substantially below the bight portion 320 and therefore will be maintained by the force of gravity in a freely moving relation with respect to the casing 317.

A further modification of the invention may include a cam for operating the closure 319. In some combination sirens and warning lights the warning light includes a sealed beam unit producing a flat beam of light and means are provided for rotating the sealed beam unit about the axis thereof by an electric motor. A cam may be provided on the rotating element of the rotating sealed beam unit. Such cam may cooperate with the closure 319 or the slidable sleeve 324 for causing periodic opening of the inlet to the siren rotor. Such cam means may include a dwell of the desired length to produce the desired characteristics in the sound issuing from the siren. In some cases it may be found desirable to provide several cam elements on the rotating element for producing the proper timing desired or a continuous cam may be provided and have any characteristics to produce the proper and desired sound effects.

From the above description of the various modifications of the invention it will be understood that the invention includes a siren with means to produce periodic intervals of sound between periodic intervals of silence and that these intervals are so arranged as to make it possible for an operator of an emergency vehicle to hear the sirens on other emergency vehicles. Further, it will be seen that the periodic interruptions in cycles of the order of 60 cycles per minute produce a more efficient warning in the reaction produced on the ears of the hearer. It will further be seen that each modification of the invention is provided with means for continuously operating the siren without interruption of sound by a simple manual control so that the siren may be used in the conventional manner. Further, it will be observed that the electrically operated siren may be used for signalling by merely disconnecting the current interrupter by opening switch 146 and manually operating the solenoid control valve by switch 145.

A further modification of the invention may include a closure for the air inlet opening to the front cover of a siren and may comprise a pivoted closure mounted for movement to open and close the inlet opening thereof. Such a pivoted closure may be operated by a solenoid such as solenoid 136 or by various cam operated means which may be driven from any suitable source of power. The cam would be so designed as to produce the desired period of sound with the period of silence being of sufficient length to allow the operator of an emergency vehicle equipped with the present invention to hear warning signals of other emergency vehicles in possible paths of collision.

The use of this invention is contemplated to include stationary sirens of the type used for air raid warnings and the like. With the electrical control circuit shown in Figure 12 the switches thereof could be operated by remote control by the use of magnetically operated switches and/or relays. By this arrangement it will be possible to produce any desired signalling effects from points remote from the location of the signal. This is particularly desirable for use in civilian defense where it is important that the sirens be operated without delay. Thus it is possible with applicant's control circuit to have switches 145 and 146 open and bring the siren up to operating speed by closing switch 142 and thereafter operating a switch 145 to produce the signals desired.

From the above description it will be seen that applicant has invented a new and useful device for controlling the sounds of sirens and the following claims are to be interpreted as broadly as consistent with the prior art.

I claim:

1. A warning siren comprising a main support, a casing fixedly mounted on the main support for housing a motor and a siren rotor, a motor fixedly mounted within the casing, a rotor having radially disposed blades fixed to the shaft of the motor and rotated thereby with the outer ends of the blades in close relation to the periphery of the casing, said casing being provided with openings through which air is moved as the rotor is rotated by the motor, a flanged tube removably mounted on said casing with the flange adjacent to the casing and the tube extending away from said rotor, a gear housing of flat shape mounted within the tube extending in the direction of the tube and radially thereof so as to interfere the least with the flow of air through the tube, a first shaft mounted in said gear housing for rotation about an axis substantially the same as the axis of the tube, a worm mounted on said first shaft, a second shaft arranged transversely of and spaced from the first shaft rotatably mounted in said gear housing, a worm gear fixed on said second shaft in mesh with the worm, a cam fixedly mounted on said second shaft exteriorly of said gear housing, a butterfly valve pivotally mounted within the tube with its minor axis substantially parallel to the said second shaft, a spring positioned between said butterfly valve and said tube urging said butterfly valve to closed position, a link having a forked end positioned with its forked and straddling said shaft of said worm gear and its other end pivotally connected to said butterfly at a point spaced from said minor axis of said butterfly, a roller mounted on said link for engagement by said cam whereby as said cam is rotated said link is reciprocated and said butterfly valve is opened, a flanged roller on said second shaft within said forked end of said link, means to retain said roller on said shaft, a collar mounted on the rotor end of said first shaft, said first shaft and collar being provided with an opening extending through said collar and said shaft, and a wire extending through said opening and having its two ends of substantially equal length and extending toward said rotor and engaging the blades thereof.

2. An attachment for a siren comprising a tube having a flange extending outwardly from one end thereof, means to secure the flanged end of the tube to a siren so that the axis of the tube is substantially in line with the axis of the siren rotor, a relatively flat gear housing secured to the inner periphery of the tube, a first shaft mounted in the housing for rotation about the axis of the tube, a worm fixed to said shaft, a second shaft mounted in said housing for rotation about an axis transverse to said tube with one end projecting from said housing, a worm gear in mesh with said worm fixedly mounted on said second shaft, a cam mounted on the projecting end of said shaft and fixed thereto, a flanged roller rotatably mounted on said projecting end of said second shaft adjacent said cam, a forked yoke having the legs thereof straddling said cam, a forked yoke having the legs thereof straddling said roller and being spaced apart an amount substantially equal to the diameter of said roller for sliding movement relative thereto, a butterfly valve pivotally mounted in said tube for rotation about an axis substantially parallel to said axis of said second shaft and spaced therefrom toward the other end of said tube, a rod secured to said yoke and pivotally connected to said butterfly valve for causing opening of said valve as said yoke is reciprocated, a follower roller rotatably mounted on said yoke between said worm gear shaft and said valve and engageable with said cam, a spring extending between said valve and said tube for normally urging said valve closed, said worm shaft extending outwardly of said housing toward the flanged end of said tube, a collar mounted on said shaft, and an elongated member extending through said collar and shaft adapted to engage the siren rotor for causing rotation of said worm and connected mechanism.

3. A siren for producing a distinctive staccato type sound comprising a siren casing having an inlet and a series of unobstructed peripheral outlets, a rotor having a plurality of radiating vanes with circumferentially arranged portions for abruptly cutting off the flow of air through said outlets, a duct extending to said inlet for supplying all of the air to said siren and having means for securing said duct in fluidtight relation to said siren casing, a compensated valve means in said duct for preventing the flow of air through said duct into said inlet, mechanical means positioned within said duct and mechanically connected to said siren rotor for periodically interrupting the flow of air into said inlet of said siren whereby a distinctive sound may be obtained.

4. The invention according to claim 3 including means for closing the valve for a major part of the time and opening the valve for brief minor parts of the time of each cycle whereby a distinctive sound is produced.

5. The invention according to claim 3 including manually operated means whereby the means for opening and closing the valve may be rendered ineffective.

6. An attachment to produce a distinctive sound for use with a conventional siren having a casing with an inlet and a series of unobstructed outlets, a rotor having a plurality of radiating vanes with circumferentially arranged portions for abruptly cutting off the flow of air through said outlets, said attachment comprising a duct extending to said inlet for supplying all of the air to said siren, means for securing said attachment to the siren with said duct in fluidtight relation to said siren casing, valve means in said duct for preventing the flow of air through said duct into said inlet, mechanical means positioned within said duct and mechanically connectable to said siren rotor for periodically interrupting the flow of air into said inlet of said siren whereby a distinctive sound may be obtained.

References Cited in the file of this patent

UNITED STATES PATENTS

| | | |
|---|---|---|
| 1,149,583 | Hutchison | Aug. 10, 1915 |
| 1,746,437 | Miley | Feb. 11, 1930 |
| 1,853,709 | Tibbetts | Apr. 12, 1932 |
| 2,028,465 | Middelton | Jan. 21, 1936 |
| 2,220,222 | Duncan | Nov. 5, 1940 |
| 2,436,603 | Ritchey | Feb. 24, 1948 |